Dec. 29, 1925.
O. C. RITZ-WOLLER
LAMP FOR MOTOR VEHICLES
Filed March 14, 1925
1,567,193
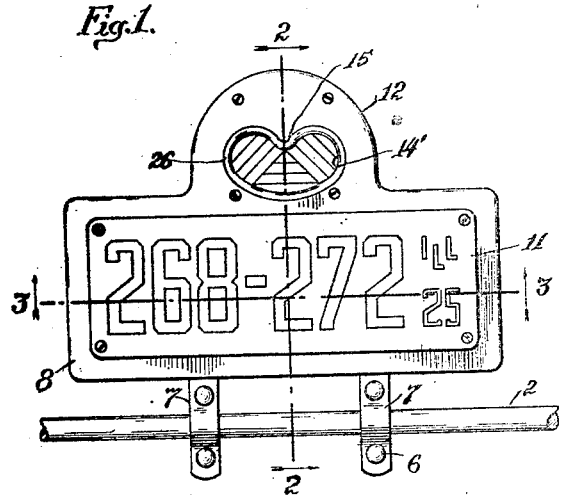
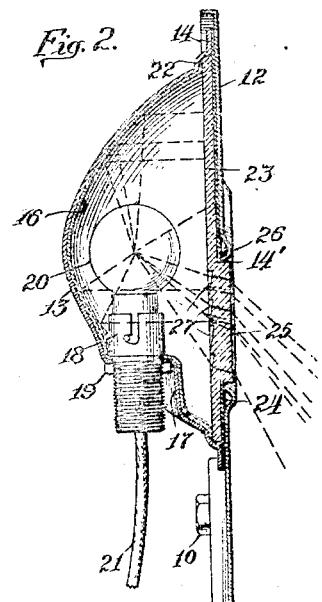
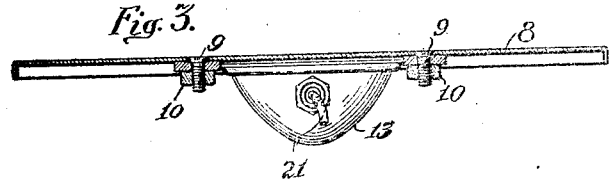
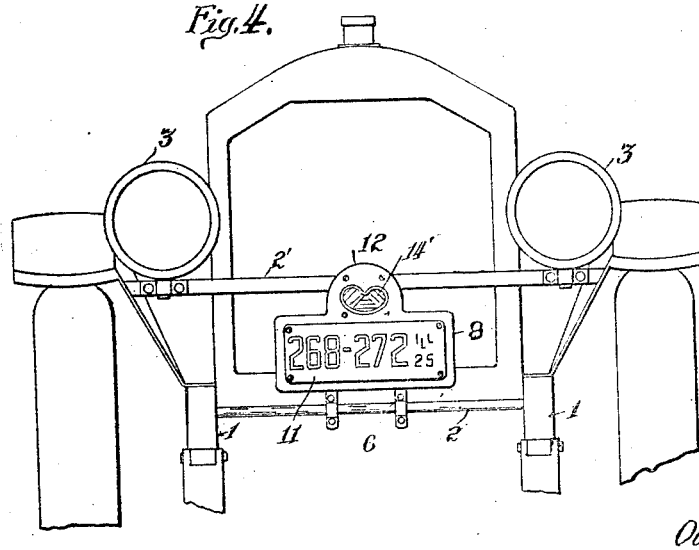
Inventor
Oliver C. Ritz-Woller
By Daniel Brennan.
Attorney Patented Dec. 29, 1925.

1,567,193

UNITED STATES PATENT OFFICE.

OLIVER C. RITZ-WOLLER, OF CHICAGO, ILLINOIS.

LAMP FOR MOTOR VEHICLES.

Application filed March 14, 1925. Serial No. 15,622.

*To all whom it may concern:*

Be it known that I, OLIVER C. RITZ-WOLLER, a citizen of the United States, residing at Chicago, in the county of Cook and State of Illinois, have invented a new and useful Improvement in Lamps for Motor Vehicles, of which the following is a specification.

This invention relates to improvements in lamps for motor vehicles, and it is an object of the invention to provide a lamp which will direct the rays of light forward and downward to eliminate the obnoxious glare so frequently leading to accidents.

Another object of the invention is to provide a lamp which is adapted to be arranged closer to the ground so as to illuminate obstacles in the path of the vehicle and to render them more clearly visible than the ordinary head lights do.

It is also an object of the invention to provide a lamp adapted to be combined with a holder for a number or license plate and adapted, owing to the arrangement of its reflector and lens, to form an area of light in close proximity to the license plate.

Another object of the invention is to provide a lamp with a lens of light diffusing qualities and to dispose the lens in a cut-out portion of a support for a number or license plate in order to direct the light in front of the vehicle.

With these and other objects in view, an embodiment of the invention is illustrated in the accompanying drawings, in which:

Figure 1 is a front elevation of the improved lamp and license plate holder;

Figure 2 is a vertical sectional view, on line 2—2 of Figure 1, on an enlarged scale;

Figure 3 is a horizontal sectional view, on line 3—3 of Figure 1, also on a larger scale, and Figure 4 shows the improved device in position on an automobile.

The frame structure 1 of the automobile usually contains one or more transverse rods 2, 2' of which one may be utilized for reinforcing the lamp brackets by which the head lights 3 are supported. The license plate or license plate holder, which in most States must be displayed on the front as well as on the rear of the vehicle, is also frequently supported by a transverse bar 2 in the front of the vehicle, and the device of the present invention comprises clamps 5 which are secured by short bolts 6 on the transverse bar 2. In the embodiment illustrated the companion clamping bars 7 are elongated beyond the upper edges of the clamping elements 5 and are secured to a plate or frame 8, as for instance by screws 9 and nuts 10, the plate 8 serving as a base for a license or number plate 11. The latter may be secured in any desired way to the plate 8, as for instance by screws.

The base 8 is provided with an upper extension 12, preferably integral with the same and having a cut-out portion which is to serve as a lens opening for a source of light disposed in the rear of this extension 12. The extension 12, therefore, acts as a cover plate for the lamp casing 13 secured to the rear of this opaque plate 12 by means of screws entering a marginal flange 14 of the lamp casing. The cut-out portion 14' in the cover plate 12 of the lamp casing 13 is shown to be kidney-shaped with the lobes of the kidney extending upward, providing thereby an apex 15 entering between the lobes and this apex is located approximately on the optical axis of the lamp casing 13, which may be of the ordinary paraboloid shape in order to facilitate the reflection of the light from the casing. This reflective power of the casing may be enhanced by the provision of a reflecting lining 16, the general shape of which also is paraboloid and which is secured on the inner wall surface of the lamp casing 13 in any approved way. A pocket 17 projecting inward from the wall of the lamp casing forms a seat for a lamp socket 18 which is held in place by a nut 19 engaging the threaded stem of the socket. The lamp 20 which is secured to the socket 18 in any approved way is then preferably located in such manner that the incandescent body of the lamp forming the source of light is located approximately or exactly in the focus of the paraboloid shaped body formed by the reflector lining 16. Conductors supplying the lamp 20 with electric current are indicated at 21.

The lamp casing 13 furthermore is provided with a marginal recess 22 adapted to receive a lens 23 which is inserted with its margin in the recess 22 so as to be retained therein, an opaque gasket 24 also provided with a cut-out corresponding to the cut-out portion 14' of the cover 12, being preferably interposed between the front face of the lens 23 and the rear face of the cover plate 12 to prevent the breakage of the lens when the same should be forcibly pressed against the cover plate. From the above description it will be seen that the lamp casing 13 with the source of light contained therein may readily be detached from the cover plate upon loosening of the holding screws which render exchange or adjustment of the lamp 20 or any other repair work possible.

For the purpose of effecting diffusion of the light emanating from the lamp 20, the lens 23 is provided at that portion which registers with the opening 14' of the cover plate, with a raised or projecting portion 25 entering said opening and surrounded by a reinforcing bead 26 which is formed in the metal of the cover plate 12.

Owing to this arrangement of the projecting part 25 which is centered by the bead 26, and owing to the arrangement of the gasket 24 interposed between the lens and the cover plate, any rattling of the lens and the resulting disadvantages will be safely avoided. The bead 26 is of a nature to yieldingly engage the projecting portion 25 to prevent lateral displacement of the lens at the front of the lamp casing 13.

The diffusion of the light emanating from the lamp 20 is greatly facilitated by the arrangement of light diffusing portions on the projecting part. These projections in the form of sets of prismatic elements 27 are disposed on that face of the lens which is directed towards the lamp so as to prevent the collection of dust and other light impeding impurities in the grooves formed between these prismatic projections. The sets of prismatic projections are arranged at angles to each other as indicated in Figure 1, the slanting surfaces of the various prisms partly refracting and deflecting the light emanating from the lamp into different angles without, however, interfering with the intensity of the light. The light rays reflected by the reflecting surface 16, together with the incident rays emanating from the lamp 20 engage the prismatic surfaces 27 of the lens 25, and are refracted during their passage therethrough in a direction approaching the normal of the surfaces 27. Upon emergence from the lens, the rays are further refracted downwardly and form an area of light in close proximity to the license plate. The angular disposal of the sets of prismatic surfaces tends to diffuse the light passing therethru. A very strong diffused light, therefore, will be projected forwardly and downwardly by this device, and it is obvious that the circuit connections for the lighting equipment on the vehicle can be arranged in such manner that upon dimming the head lights 3 the lamp 20 is supplied with current of a higher voltage, thereby illuminating the path in front of the vehicle without, however, blinding any pedestrian or passengers in vehicles traveling in the opposite direction.

I claim:

1. As an article of manufacture, a license plate support, having an extension with a cutout portion, a lamp casing, a paraboloid reflector in the casing, a fixture for holding a source of light in the focus of the reflector, and a lens inserted into the cutout portion of the extension having on one of its faces a plurality of prismatic projections angularly disposed with relation to one another.

2. As an article of manufacture, a license plate support having a central extension on one side of the same, a paraboloid reflector in the rear of said extension, a fixture for holding a lamp focally in said reflector, the extension being provided with a kidney-shaped cutout portion the lobes of which kidney extend away from the main portion of the license plate support, while the apex centrally disposed with relation to the lobes extends in direction towards the main portion of the license plate support, and a prismatic lens projecting thru the cutout portion.

3. As an article of manufacture, a license plate support having a central extension along one longitudinal edge of the same, a lamp casing of opaque material attached to the rear of said extension and having a marginal flange extending parallel to the body of the license plate and the extension, a reflector in the casing, means for holding a lamp focally with respect to the reflector, the extension having a cutout portion disposed out of the axis of the reflector, a lens having a portion projecting through said cutout and a portion located in the rear of the extension, the portion of the lens projecting through the cutout portion being of prismatic character and being adapted to throw the rays of light emanating from the lamp forward of the main portion of the license plate and in close proximity thereto.

4. As an article of manufacture, a license plate support having a central extension on one side, a lamp casing attached to the rear of the extension, a reflector in the casing, means in the casing for holding a lamp focally in the reflector, the extension being provided with a kidney-shaped cutout portion and disposed in the plane of the said support and out of the axis of the reflector, a glass plate forming the front wall of the casing, a portion of said glass plate being formed as a prismatic lens projecting through the cutout portion of the extension and adapted to throw the light forward, and a gasket inserted between said glass plate and said extension, the gasket being cutout to permit the lens-like portion of the glass plate to project threrethrough and through the cutout portion of the extension.

5. As an article of manufacture, a license plate support having along one of its longitudinal edges and centrally between the lateral edges an extension in the plane of the support, the extension being provided with a kidney-shaped cutout portion, a lamp casing of opaque material secured to said extension in the rear thereof and having a marginal recess, a paraboloid reflector in the casing, the cut-out portion being disposed out of the axis of the reflector, and a glass plate marginally engaged in the marginal recess of the lamp casing, a portion of said plate projecting through the kidney-shaped opening in the extension and having prismatic corrugations extending at angles to each other and adapted to throw the light of a lamp in the casing forward and downward of the main portion of the license plate support.

6. As an article of manufacture, a license plate support having a lateral extension with a cutout portion therein, a lamp casing of opaque material in the rear of said extension, a lamp seating fixture in the casing, the cutout portion being kidney-shaped with the lobes projecting away from the main portion of the license plate, and a prismatic lens inserted into said cutout portion, said prismatic lens having parallel corrugations substantially at right angles to the axis of the lobes and parallel corrugations substantially at right angle to the apex of the cutout portion.

7. As an article of manufacture, a license plate support having a central extension on one side with a cutout portion in the extension adjacent the main portion of the license plate support, and in substantially the same plane, a lamp casing of opaque material seated in the rear of the extension, a paraboloid reflector within the lamp casing, a lamp seating fixture in the casing adapted to hold a lamp in focal relation to said reflector, a glass plate in the lamp casing and in front of the reflector, and a lens integral with the glass plate and projecting through the cutout portion of the extension, the cutout portion being disposed out of the focal relation with respect to said reflector.

8. A device of the character described comprising a license tag support having an upwardly extending portion, a lamp casing located at the rear of the extension and provided with a paraboloid reflector and a light fixture, the extension being provided with a relatively small opening, a transparent plate covering the rear face of the extension, said plate having a part thereof adapted to project through the opening in the extension, the remaining relatively large portion of the transparent plate adapted to afford additional reflecting surface to direct the light through the opening.

9. A device of the character described comprising a license tag support having at the upper edge thereof an upwardly extending portion, a lamp casing located at the rear of the extension and provided with a paraboloid reflector and a light fixture, the extension being provided with a relatively small kidney shaped opening located in proximity to the lower edge of the extension, an antirattler gasket between the transparent plate and the extension, said plate having a part thereof adapted to project through the opening in the extension, the remaining relatively large portion of the transparent plate adapted to afford additional reflecting surface to direct the light through the opening.

10. In a device of the character described the combination of a carrier comprising a plate with depending arms provided with clamps to affix the said carrier to a vehicle, a license tag attached to the plate, said plate having an upward extension with a cutout portion therein and adapted to support a reflector in which is located a light, the cutout portion being disposed away from the axis of the reflector, a lens having a thickened portion which projects through said cutout portion, said lens being held in position between the said reflector and plate by a substantially enlarged marginal portion which is opaque to afford additional reflecting surface, whereby all the light from its source is directed through the lens downwardly and forward of the license tag.

11. An article of manufacture, the combination of a license tag support and illuminator comprising a plate adapted to have a tag secured thereto, depending arms provided with clamps to affix the support to a vehicle, said plate having an upward extension with a central cutout portion therein and supporting a paraboloid reflector, a light support located in front of the reflector above the cutout portion, a lens having a thickened ribbed portion projecting through said cutout portion and held in position between the said paraboloid reflector and plate by a substantially enlarged marginal portion, an antirattler gasket interposed between the lens and plate, said enlarged marginal portion being rendered opaque by the said plate, said enlarged portion affording an additional reflecting surface thereby directing all the light from its source through the lens downwardly and forward of the license tag.

In testimony whereof I affix my signature at 10 South La Salle Street, Chicago, Illinois.

OLIVER C. RITZ-WOLLER.